Aug. 4, 1964     E. EGGER     3,143,365
FLEXIBLE CONNECTING MEANS
Filed Oct. 4, 1962
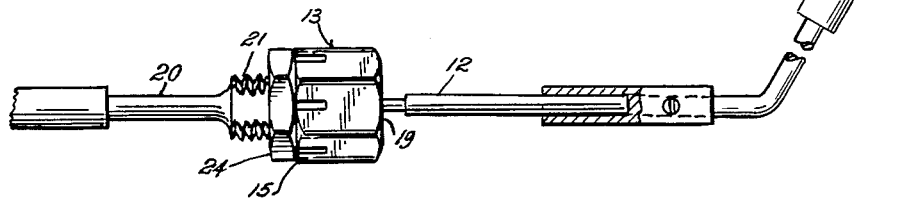
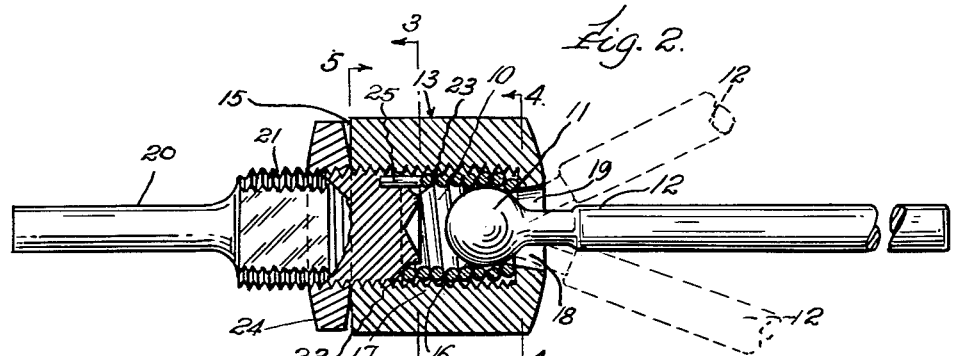
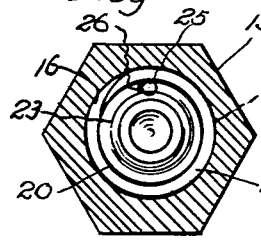
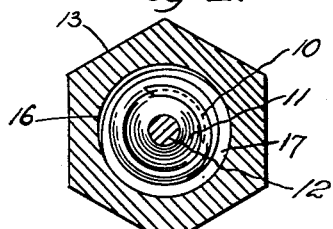
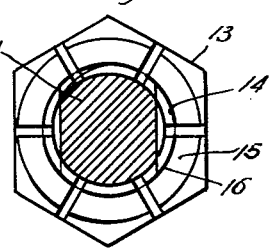
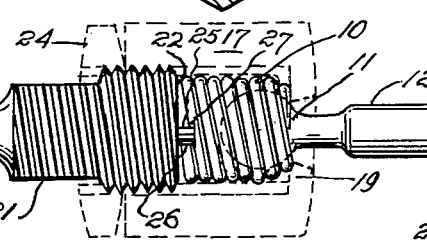
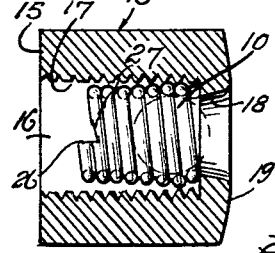
INVENTOR.
*Ernest Egger.*
BY *James R. McKnight.*
*Attorney.*

United States Patent Office 3,143,365
Patented Aug. 4, 1964

3,143,365
FLEXIBLE CONNECTING MEANS
Ernest Egger, 306 Comstock St., Joliet, Ill.
Filed Oct. 4, 1962, Ser. No. 228,395
1 Claim. (Cl. 287—12)

This invention relates to a means for the retaining of a ball held within a resilient coiled spring, the ball supporting a rod, and adapted to be pivoted with the spring for desired positioning of the rod.

An object of the present invention is to provide a construction with a bolt, and nut co-operating with a capped nut that will house a ball pivotally held within a resilient coiled spring so as to prevent the ball from popping out of the spring.

Another object of my invention is to supply a retaining means for a ball pivotally held within a coiled spring, so that tension requirements of the spring may be minimized, simpler and less exacting springs and balls may be used and longer life in use may be achieved.

Another object is to provide a retaining means to prevent sidewise movement or flapping of the coiled spring in use.

My invention also comprises such other objects, advantages and capabilities as will later more fully appear and which are inherently possessed by my invention.

While I have shown herein preferred embodiments of my invention, yet it is to be understood that the same are susceptible of modification and change without departing from the spirit of my invention.

Referring to the drawings, FIG. 1 is a front elevational view of my flexible connecting means; FIG. 2 is an enlarged longitudinal sectional view of the same; FIG. 3 is a sectional view on line 3—3 of FIG. 2; FIG. 4 is a sectional view on line 4—4 of FIG. 2; FIG. 5 is a sectional view on line 5—5 of FIG. 2; FIG. 6 is an elevational view of cooperating parts; FIG. 7 is a detailed diagrammatic view of the spring and nut construction; and FIG. 8 is an elevational view of a modified form showing the bar extending between flexible connecting means on each end.

An embodiment selected to illustrate my invention comprises a coiled resilient expansible spring 10 within which is positioned ball 11. A rod 12 is attached to or integral with ball 11 and extends outwardly from said ball as it is held by said spring 10. The coils of spring 10 are tightly wound around ball 11 so as to hold said ball and prevent it leaving engagement within spring 10. I prefer ball 11 to be seated well within the open ends of the coil, so that a greater portion of its surface is contacted and covered by the coils of the spring.

Prior to the insertion of the ball in the spring, I provide that the diameter of the coils of the spring be slightly less than the diameter of the ball, so that in order to place the ball within the spring, it is necessary to expand or stretch the diameter of the coils of the spring so as to permit the ball to be inserted within the opening of the spring. The expanding pressure on the spring is then released, so that the coils of the spring move back toward their original diameter and tightly grip the inserted ball.

A rod 12 is attached to said ball 11 and extends outwardly from said ball as it is held by said spring 10.

A capped nut 13 has an opening 14 at its inner end 15 communicating with a hollow interior 16 surrounded by screw threaded inner walls 17. Said walls 17 are conically tapered at reduced outer opening 18 which extends through flange 19. The diameter of the hollow interior is slightly larger than the diameter of the coiled spring 10 holding ball 11. The diameter of outer opening 18 is less than the diameter of coiled spring 10 holding ball 11.

Rod 12 is positioned, so that its outer portion extends through outer opening 18 of capped nut 13. Coiled spring 10 is of a size to extend within the hollow interior 16 of capped nut 13 with the outer end of spring 10 resting on the inwardly tapered portion of inner walls 17.

A bar 20 has at its inner end a screw threaded bolt portion 21 which engages the screw threads of inner walls 17. The inner end 22 of bolt 21 has a projection 23 reduced in size and dished to fit within the inner end of the coil of spring 10. This prevents sidewise movement or flapping of the coiled spring. A screw threaded nut 24 is mounted on bolt 21 to engage its screw threaded portion and be moved on said bolt to engage the inner end 15 of capped nut 13 for locking the parts in position.

In use, in spite of the tension holding ball 11 in coiled spring 10, my rod 12 may be moved against the tension of the spring to pivot the ball within the spring and move the rod to a desired position. When the rod has been so moved, the tension of the spring holds the ball and the rod in the chosen position, until the rod is again moved. This permits great range of movement and a wide variation of positions.

My construction retains the coiled spring held ball in position and makes it impossible for the ball to pop out of the spring.

As an additional embodiment, I may provide for bar 20 to have a similar screw threaded bolt portion also a its outer end and to repeat and duplicate on that end the foregoing construction, so as to provide rods movable independently of each other on their respectively spring held balls. This is shown in FIG. 8.

It is to be noted that with the use of my capped nut, and the bolt and nut on my bar, that I retain the coiled spring held ball in position. The ball cannot pop out of the coiled spring. It is in effect locked in its pivotal position within the coiled spring. This permits the use of springs with less tension than heretofore. In the past, it has been necessary to have a spring of required high tension to be sure to hold the ball. With my construction, this high and expensive requirement of a spring with high tension is not necessary. I may use springs of less tension, because they will be held in position on the ball by my retaining structure. This enables the use of less exacting coiled springs for sockets. It also insures longer lasting life for a coiled spring held ball as well as its sure and better operation.

In order to prevent coiled spring 10 from rotating, I provide pin 25, with its inner end embedded in inner end 22 of bolt 21 and its outer end extending therefrom so as to engage the end 26 of coiled spring 10 and rest on notch 27 of the next coil of coiled spring 10. This stop means will prevent rotation of the spring within the capped nut and protect rod 12 from breaking off.

By moving capped nut 13 clockwise on bolt 21, spring 10 is compressed. This tends to relieve pressure on ball 11. The result of this is that when rod 12 is then moved ball 11 pivots on its socket in spring 10 more easily and with less friction.

By moving the capped nut 13 in the opposite direction, or counter clockwise, spring 10 expands. Spring 10 then grasps ball 11 more tightly. The result of this is that when rod 12 is moved, ball 11 pivots on its socket in the spring 10 less easily wtih more firmness, rigidity or with more friction.

By adjusting the position of capped nut 13 on bolt 21, the desired degree of compression of the spring 10 with resultant pivoting of the ball 11 in spring 10 is obtained.

My enclosing structure not only protects the spring held ball, but also facilitates the retention of desired lubricant. The lubricant does not destroy the firm grasp of the joint.

With the tapering of my coiled spring 10 to cooperate with the taper in the inner walls 17 of capped nut 13, ball 11 may be more closely positioned to outer opening 18.

Having thus described my invention, I claim:

A flexible connecting means comprising a coiled spring, a ball positioned within said coiled spring, said spring having a diameter slightly less than the diameter of the ball before insertion therein so that after insertion said ball is tightly but pivotally held within said spring, a rod connected to and extending outwardly from said ball, a capped nut having a hollow interior with screw threaded inner walls and a flange with a reduced opening at its outer end, said coiled spring holding said ball being within the hollow interior of said capped nut and said rod extending outwardly through the reduced opening of said capped nut, a bar having a screw threaded bolt portion at one end engaging the screw threads on the inner walls of said capped nut, said bolt portion having a reduced end fitting within one end of said coiled spring, a pin attached to said bolt portion and engaging one end of said coiled spring to prevent rotation of the spring, and a nut threaded on said bolt portion and engaging the inner end of said capped nut, said rod adapted to be pivoted on said ball to extend and be held by said spring in a desired direction.

References Cited in the file of this patent

UNITED STATES PATENTS

| | | |
|---|---|---|
| 773,973 | Palmenberg | Nov. 1, 1904 |
| 941,031 | McBean | Nov. 23, 1909 |
| 2,945,714 | Egger | July 19, 1960 |

FOREIGN PATENTS

| | | |
|---|---|---|
| 1,012,656 | France | Apr. 16, 1952 |